United States Patent [19]

Prinz

[11] 3,764,627

[45] Oct. 9, 1973

[54] SEPARATION OF ALCOHOLS AND KETONES USING METHYLENE CHLORIDE AND WATER

[75] Inventor: Roy H. Prinz, Robstown, Tex.

[73] Assignee: Celanese Corporation, New York, N.Y.

[22] Filed: Mar. 19, 1971

[21] Appl. No.: 126,263

[52] U.S. Cl. ......... 260/593 P, 260/452, 260/637 R, 260/643 D
[51] Int. Cl. ............................................ C07c 49/04
[58] Field of Search ...................... 20/593 P, 643 D, 20/637 R, 452

[56] References Cited
UNITED STATES PATENTS

| | | |
|---|---|---|
| 3,419,477 | 12/1968 | Mattia ............................ 260/593 P |
| 3,404,186 | 10/1968 | Bailey et al. ................ 260/643 D X |
| 2,510,806 | 6/1950 | Egberts et al. ............... 260/643 D X |
| 2,245,945 | 6/1941 | Van Dyck et al. .......... 260/593 P X |

*Primary Examiner*—Howard T. Mars
*Assistant Examiner*—Leo B. DeCrescente
*Attorney*—Thomas J. Morgan, C. E. Miller, K. A. Genoni and M. Turken

[57] ABSTRACT

A dual solvent extraction process for separating mixtures of aliphatic ketones and water soluble alcohols, such as mixtures of acetone and methanol, one phase of the dual solvent being water and the other being methylene chloride. The alcohols are preferentially dissolved into the water phase and the ketones into the methylene chloride phase.

7 Claims, No Drawings

SEPARATION OF ALCOHOLS AND KETONES USING METHYLENE CHLORIDE AND WATER

BACKGROUND OF THE INVENTION

The present invention relates to a solvent extraction process for the separation and recovery of water soluble alcohols from mixtures with aliphatic ketones.

In various chemical processes there results a stream containing a mixture of an aliphatic ketone, such as acetone, with a water soluble alcohol such as methanol. For example, in the oxidation of hydrocarbons there usually results a mixture of oxygenated products such as carboxylic acids, alcohols, ethers and carbonyl compounds. In separating this mixture by a series of distillations into its various components there may result a stream comprising a mixture of an alcohol or alcohols with a ketone or ketones. In many instances such mixtures are difficult to separate by distillation because of the formation of azeotropes and because of the closeness of boiling points. Methods other than distillation have been devised to accomplish such separations but there is a need for new and more efficient means for effecting the separations.

SUMMARY

It is, thus, an object of the present invention to provide a method for separating water soluble alcohols from mixtures with aliphatic ketones. It is a particular object of the present invention to provide a method for separating methanol from its mixtures with acetone such that the methanol may be recovered. A further object of the present invention is to provide a dual solvent system which will effect the separation of water soluble alcohols and ketones. Additional objects will become apparent from the following description of the present invention.

These and other objects are accomplished by the present invention which in one of its aspects is a dual solvent extraction process comprising the successive steps of (a) intimately contacting in an extraction zone a mixture comprising dialkyl ketones and water soluble alcohols with both phases of a dual solvent system, one phase of said dual solvent system being water and the other methylene chloride, (b) allowing a water phase enriched in said alcohols and a methylene chloride phase enriched in said ketones to form, (c) separating said water phase from said methylene chloride phase, and (d) treating the thus separated water phase to recover the water soluble alcohols therefrom.

DESCRIPTION OF THE PREFERRED EMBODIMENTS

The use of dual solvent extraction systems for purification and separation of various compounds is well-known and may be accomplished in a variety of manners. In general, these dual solvent systems merely involve the intimate contact of a mixture to be separated with both phases of the dual solvent system, which phases are immiscible, such that one component of the mixture is preferentially dissolved into one of the phases, the other component of the mixture being dissolved in the other phase. The component of the mixture of which recovery is desired is then recovered from solution in its particular phase. Any of the known methods for accomplishing a dual solvent extraction may be utilized to carry out the present invention. For example, mixer-settlers may be used where the alcohol-ketone mixture is merely added to a vessel containing both solvent phases of the dual solvent system and then the mixture agitated vigorously to accomplish intimate contact of the alcohol-ketone mixture with each of the two solvent phases. As pointed out above, in a dual solvent system the two solvent phases are immiscible when present in the proper amounts such that a vigorous agitation is generally required to insure proper contact of the mixture with both phases. After sufficient mixing, the phases are allowed to layer or settle out through gravity or through the use of a centrifuge.

Particularly if a continuous process is to be utilized, the dual solvent extraction is preferably accomplished in some sort of vertical tower which, in order to increase efficiency, generally contains packing, baffles or trays. In using such towers the mixture to be separated will be fed to the tower at a midpoint thereof while the heavy phase of the dual solvent system (in this invention methylene chloride) will be fed to an upper point in the tower and above the feed point of the mixture. The lighter phase of the dual solvent system will be fed to a lower point in the tower and below the feed point of the mixture. Through gravity the lighter phase will migrate upwardly preferentially dissolving, in the case of the present invention, the water soluble alcohol and will be removed overhead. The heavier phase will migrate downwardly through the tower dissolving, in the case of the present invention, the ketone and be removed as bottoms from the tower. The overhead from the tower may then be treated such as by distillation for isolation of the water soluble alcohol while the bottoms may be treated for isolation of the ketones. Both the water recovered from the water phase and the methylene chloride recovered from the methylene chloride phase may be recycled to the extraction tower if desired.

The ketones with which the present invention is concerned are those aliphatic ketones containing a single carbonyl group attached to two alkyl groups, in other words dialkyl ketones. Preferably, each alkyl group of the dialkyl ketones contains from one to four carbon atoms with the invention being most applicable to the ketone having only one carbon atom in each alkyl group, that is, acetone. Others include methyl ethyl ketone, dibutyl ketone, dipropyl ketone, diethyl ketone, ethyl butyl ketone, methyl isopropyl ketone, methyl n-propyl ketone, methyl isobutyl ketone and methyl n-butyl ketone.

The alcohols that may be recovered are those which are water soluble. Generally speaking, these are the monohydric alkanols of one to four, especially one to three, carbon atoms which are water soluble and the alkanediols of two to six carbon atoms which are water soluble. By the term "water soluble" as used herein is meant that the solubility in water at 25° C. is at least 100 grams per 100 milliliters of water and, therefore, the water soluble monohydric alkanols will generally be selected from the group consisting of methanol, ethanol, isopropanol, n-propanol, and tert-butanol. Included in the alkanediols or glycols to which the invention is suited are ethylene glycol, 1,5-pentanediol, 2,3-butanediol, 1,4-butanediol, 1,2-propanediol and the like. Mixtures of more than one alcohol may be separated from mixtures with more than one ketone by the present invention, in such cases there of course being a mixture of alcohols present in the water phase removed from the extraction zone and a mixture of ketones present in the methylene chloride phase removed from the extraction.

There may be present in the ketone alcohol mixture to be separated in accordance with the invention other components, impurities, etc., such as ethers and aldehydes, but these other compounds are preferably present in minor amounts. Water may also be present. However, since both the ketones and the alcohols to be separated are generally very water soluble and since water is to be added to the mixture anyway in the extraction zone, its presence does not generally affect a separation in accordance with the invention. Water usually, however, will not be present in such mixtures to any appreciable extent until added in accordance with the present invention. The ratio of alcohol to ketone is within the range of 1:1 to 10:1. Generally speaking, the stream to be treated in accordance with the invention will be one comprising by volume from about 25% to 95% water soluble alcohol, 5% to 75% ketone and 0% to 50% water, the total, of course, being 100%. Especially suitable are those mixtures which by volume consist essentially of 50% to 92% alcohol and 8% to 50% ketone.

The temperature at which the extraction may take place may be ordinary temperatures, for example, within the range of about 10° C. to 100° C. but preferably within the range of 15° C. to 40° C. The pressure during the extraction needs only to be sufficient to prevent boiling and maintain the liquid phase and may be subatmospheric, atmospheric or superatmospheric. Due to the low boiling point of various of the components which may be present in the extraction zone, for example methylene chloride which has a normal boiling point of about 40° C., extraction is preferably accomplished below the normal boiling point of any components present in the extraction zone so that superatmospheric pressures are not required. Temperatures of 20° C. to 30° C. are for this reason particularly suitable.

In supplying the water to the extraction zone, it should be provided in amounts such that there are generally at least one, for example, 1 to 10 volumes of water present for each volume of the mixture of alcohols and ketones. Preferably 1.1 to 2.0 volumes of water are present for each volume of the mixture of alcohols and ketones. Of course, if water is already present in the alcohol-ketone feed to the extraction zone this will be taken into account in considering the amount necessary to add in order to achieve the desired ratio. Although the volume ratio of water to the combined volume of alcohols and ketones present should be at least 1:1 as pointed out above, it is preferably kept as low as possible since increasing the amount of water over that minimally needed does not serve to increase separation efficiency to any appreciable extent. If the ratio of water to the alcohol-ketone mixture falls below about 1:1 then the mixture will act as a mutual solvent between the water and methylene chloride such that phasing will cease to occur in the extraction zone. In other words, a water phase and a methylene chloride phase would not form. The volume of methylene chloride passed to the extraction zone may vary with increasing amounts of the methylene chloride generally effecting a better separation, that is, resulting in less of the ketone in the water phase removed from the extractor. Generally, however, there should be an amount of methylene chloride such that there are from 0.5 to 10.0 preferably 1.0 to 5.0 volumes of methylene chloride per volume of the alcohol-ketone mixture present.

After the water phase and the methylene chloride phase are removed from the extraction zone they may be treated by conventional techniques to recover the various components thereof. Distillation is the most apparent method and is the recommended procedure for accomplishing such recovery. In order to recover the alcohol the water phase may be subjected to one or a series of distillations depending on the desired purity. It is pointed out that the water phase will usually contain residual amounts of the methylene chloride, for example, 1% to 5% by volume, as well as smaller amounts of the ketone, typically less than 0.1% by volume. No problems are encountered in removing such amounts of methylene chloride and/or ketone by distillation. Likewise the methylene chloride phase removed from the extraction zone will usually contain small percentages of alcohol and/or water the removal of which may be effected by distillation. The details of such distillations will not be discussed as distillation techniques are well-known and readily apparent to those skilled in the art.

In order to illustrate the present invention the following examples are offered but should not be taken in a limiting sense. All percentages, parts and ratios are by volume unless otherwise indicated.

EXAMPLE I

An extractor tower was fabricated which was 9 feet in height, 2 inches in diameter and packed with ½ inch Berl saddles. About 6.7 ml/min of a mixture containing about 68% methanol, 14% acetone, 6% methyl ethyl ketone and 12% of mixed alkyl ether impurities together with 1.0 ml/min of the recycle from a hereafter mentioned light ends column was fed to the midpoint of the extractor tower. The feed mixture was one obtained from the oxidation of normally gaseous hydrocarbons. Water was fed as a side stream to the bottom of the tower at a rate of 8.3 ml/min and methylene chloride was fed as a side stream near the top of the tower at a rate of about 18.3 ml/min. The tower was operated at atmospheric pressure and a temperature of 25° C.

A water phase enriched in methanol was removed from the top of the tower at a rate of about 14.7 ml/min while a methylene chloride phase enriched in acetone was removed at a rate of about 19.6 ml/min as bottoms from the extractor tower. The interphase was maintained near the bottom of the tower. Analysis of the phases removed from the tower by gas chromatography showed the water phase contained about 60.4% water, 36.6% methanol, 3.0% methylene chloride and 0.003% acetone. Analysis of the methylene chloride phase showed it to contain about 7.2% acetone, 84.8% methylene chloride, 3% methyl ethyl ketone and 5.0% mixed alkyl ethers.

The water phase was then passed to a 25-tray light ends distillation column operated at a reflux ratio of 35:1 and atmospheric pressure. The overheads from the light ends column which was recycled to the extractor feed was removed at about 59° C. and contained about 0.034% acetone, 62.5% methanol and 37.4% methylene chloride while the bottoms which was removed at a temperature of about 80° C. from the light ends column contained about 36.0% methanol and 64.0% water. This bottoms fraction was further treated in a 30-tray methanol finishing column operated at a reflux ratio of 10:1, atmospheric pressure, an overhead tray temperature of 64° C. and a bottoms temperature of 100° C. Recovered overhead from the methanol finishing column was a methanol product of 99.9% purity and a bottoms product of 99.6% water and about 0.4% methanol.

The bottoms or methylene chloride phase from the extractor column was distilled to remove methylene chloride and then the residue subjected to azeotropic distillation with n-pentane to recover the acetone. The pentane-acetone azeotrope was extracted with water to recover the acetone therefrom.

EXAMPLE II

In order to determine the effect that the amount of methylene chloride passed to the extractor had on separation efficiency, Example I was repeated except that the amount of methylene chloride passed to the extractor tower was reduced. When the methylene chloride feed rate was reduced to about 15.5 ml/min the acetone present in the water layer removed from the extractor increased to about 0.23%. When the methylene chloride feed rate was reduced to about 10.5 ml/min the acetone present in the water layer increased to about 0.44%.

The embodiments of the invention in which an exclusive property or privilege is claimed are defined as follows:

1. A dual solvent extraction process for the separation of dialkyl ketones having one to four carbon atoms in each alkyl group and alcohols selected from the group consisting of methanol, ethanol, isopropanol, n-propanol, tert-butanol, ethylene glycol, 1,5-pentanediol, 2,3-butanediol, and 1,2-propanediol comprising the successive steps of (a) intimately contacting in an extraction zone a mixture comprising said ketones and said alcohols with water and methylene chloride, wherein there is provided to said extraction zone an amount of water such that there are from 1 to 10 volumes of water present for each volume of the mixture of alcohols and ketones and wherein there is provided to said extraction zone an amount of methylene chloride, such that there are from about 1.0 to 5.0 volumes of methylene chloride present for each volume of the mixture of alcohols and ketone, (b) allowing a water phase enriched in said alcohols and a methylene chloride phase enriched in said ketones to form, and (c) separating said water phase from said methylene chloride phase.

2. The process of claim 1 wherein said water soluble alcohol is methanol and wherein said ketone is acetone.

3. The process of claim 1 wherein said mixture contains by volume from about 50% to 92% water-soluble alcohol and 8% to 50% dialkyl ketone.

4. The process of claim 1 wherein said water phase is treated so as to recover the water-soluble alcohols therefrom.

5. The process of claim 1 wherein there is provided to said extraction zone an amount of water such that there is from about 1.1 to 2.0 volumes of water present for each volume of the mixture of alcohols and ketones.

6. The process of claim 5 wherein said alcohol is methanol, wherein said ketone is acetone and wherein the intimate contact of said mixture with both phases of said dual solvent system is accomplished at temperatures within the range of about 15° C. to 40° C. and the pressure sufficient to prevent boiling.

7. The process of claim 6 wherein the methanol is recovered from said water phase by distillations.

* * * * *